(12) United States Patent
Papanide et al.

(10) Patent No.: US 8,201,954 B2
(45) Date of Patent: Jun. 19, 2012

(54) COMPENSATION FOR TRANSIENT HEATING OF LASER MIRRORS

(75) Inventors: Adrian Papanide, Shelton, CT (US);
Leon A. Newman, Glastonbury, CT (US); Lanny Laughman, Bolton, CT (US)

(73) Assignee: Coherent, Inc., Santa Clara, CA (US)

( * ) Notice: Subject to any disclaimer, the term of this patent is extended or adjusted under 35 U.S.C. 154(b) by 496 days.

(21) Appl. No.: 12/464,442

(22) Filed: May 12, 2009

(65) Prior Publication Data

US 2010/0172042 A1      Jul. 8, 2010

Related U.S. Application Data

(60) Provisional application No. 61/143,238, filed on Jan. 8, 2009.

(51) Int. Cl.
*G02B 7/182* (2006.01)

(52) U.S. Cl. ....................................................... 359/871

(58) Field of Classification Search .................. 359/845, 359/846, 849, 871, 872
See application file for complete search history.

(56) References Cited

U.S. PATENT DOCUMENTS

| 3,836,236 | A |   | 9/1974 | Kirk et al. |   |
|---|---|---|---|---|---|
| 4,266,857 | A | * | 5/1981 | Svenson | ........................ 359/845 |
| 4,287,421 | A |   | 9/1981 | DeBaryshe et al. |   |
| 4,719,639 | A |   | 1/1988 | Tulip |   |
| 5,020,895 | A |   | 6/1991 | Giesen et al. |   |
| 5,048,048 | A |   | 9/1991 | Nishimae et al. |   |
| 5,140,606 | A |   | 8/1992 | Yarborough et al. |   |
| 5,751,750 | A |   | 5/1998 | Friede et al. |   |
| 6,255,599 | B1 |   | 7/2001 | Chang et al. |   |
| 6,709,118 | B2 | * | 3/2004 | von Borstel et al. | .......... 359/872 |
| 6,912,052 | B2 |   | 6/2005 | Rao et al. |   |
| 2009/0034577 | A1 |   | 2/2009 | Newman et al. |   |

FOREIGN PATENT DOCUMENTS

| DE | 3330626 A1 | 6/1987 |
|---|---|---|
| EP | 1235090 A1 | 8/2002 |

OTHER PUBLICATIONS

International Preliminary Report on Patentability received for PCT Patent Application No. PCT/US2009/069194, mailed on Jul. 21, 2011, 10 pages.
International Search Report and Written Opinion received for PCT Patent Application No. PCT/US2009/069194, mailed on Jul. 5, 2010, 14 pages.

* cited by examiner

*Primary Examiner* — Euncha Cherry
(74) *Attorney, Agent, or Firm* — Morrison & Foerster LLP

(57) ABSTRACT

A mirror assembly for a carbon dioxide ($CO_2$) slab laser resonator includes a center section having a rectangular cross-section and a pair of thermal balancing bars. A concave reflecting surface formed on a front edge of a center section. The side-bars are attached to either side of the center section and extend forward of the reflective surface. Dimensions of the center section and side bars are selected to position the thermal neutral plane of the assembly close to the reflective surface. This minimizes changes the radius of curvature of the reflective surface due to heating by circulating radiation in the resonator.

21 Claims, 8 Drawing Sheets

COMPENSATION FOR TRANSIENT HEATING OF LASER MIRRORS

PRIORITY CLAIM

This application claims priority of U.S. Provisional Application No. 61/143,238, filed Jan. 8, 2009, the complete disclosure of which is hereby incorporated by reference.

TECHNICAL FIELD OF THE INVENTION

The present invention relates in general to gas discharge lasers. The invention relates in particular to the design and construction of mirrors for hermetically sealed, high power, diffusion-cooled, carbon dioxide ($CO_2$) slab lasers.

DISCUSSION OF BACKGROUND ART $CO_2$ slab lasers include a pair of rectangular, plane, metal electrodes mounted within a sealed housing containing a laser gas mixture including $CO_2$ and inert gases. The electrodes are parallel to each other and spaced close together to define a slab-shaped discharge region. RF power is used to excite the gas mixture to for generating laser radiation. A description of such a laser can be found in U.S. Pat. No. 5,140,606 assigned to the assignee of the present invention and the complete disclosure of which is hereby incorporated herein by reference.

This type of laser typically includes a hybrid optical resonator. The resonator is an unstable resonator in the width-dimension of the parallel spaced apart electrodes and a waveguide type resonator in a dimension perpendicular to the plane of the electrodes. In early models the unstable resonator was a positive branch unstable resonator. In later models a negative branch unstable resonator was preferred.

A positive branch unstable resonator designs is about an order of magnitude more difficult to align than a negative branch unstable resonator but is much less sensitive to output beam pointing variations that result from changes in the curvature of mirrors of the resonator, which changes result in turn from changes in the temperature of the mirror. A negative branch unstable resonator is much more sensitive to temperature induced mirror curvature changes. Beam-pointing variations are a problem in most applications where the laser beam must be steered or directed accurately to a particular location or locations on a workpiece.

Analysis indicates pointing-variations of a laser beam scale directly with the width of a negative branch unstable resonator and inversely as the square of its length. Designing a shorter industrial $CO_2$ laser is looked upon with favor in the industrial application of $CO_2$ lasers provided beam quality is not compromised. As the length of the discharge is made shorter, the width of the discharge needs to be increased to maintain the same discharge area required to obtain the same laser output power.

A negative branch unstable resonator includes an output coupling mirror and a return mirror each having concave reflecting surfaces. The surfaces are made highly reflecting by depositing multilayer thin film coatings on the surfaces. The output coupling mirror is shorter than the return mirror in order to provide for an output for the laser beam past the mirror. The return mirror normally extends over the entire width of the discharge generated by the parallel facing electrodes. The output coupling mirror is shorter to allow a portion of the radiation circulating in the resonator to bypass the mirror as output radiation.

When a laser beam is circulating in the resonator the reflecting surfaces of the mirrors are heated as the laser mirrors have a small, but finite, optical absorption. When the laser is suddenly turned on to a sufficiently high full power, rapid heating of the reflective surface causes the surface to suddenly distort. The mirror becomes suddenly less concave, i.e., suddenly has an increased radius of curvature. This sudden increase in the curvature radius causes the laser beam to suddenly point in another direction. The radius of curvature quickly recovers to nearly its original radius as the fast transient heating is quickly conducted away by the mirror body.

The heat from the reflecting surface eventually propagates through the thickness of the mirror body establishing a temperature gradient between the front and back surfaces of the mirror. This thermal gradient further cause the mirror to become less concave until a steady state mirror curvature is reached at a given laser power. The back of the mirror is typically attached to a large metal plate, which is an end flange of a sealed housing in which the resonator and laser gas are enclosed. This causes the back of the mirror to be cooler than the front surface. The difference in the time response between the transient and steady-state mirror radius change is over two orders of magnitude.

Under low laser pulse repetition frequency (PRF) operation, the mirror radius changes directly in response to the changes in the PRF. As the PRF increases, the thermal time constant of the mirror assembly begins to average out the time variations in the mirror radius of the mirror. The PRF at which the averaging begins is dependent on the thermal time constant of the material from which the mirror is made and the mass of the mirror.

One arrangement directed at minimizing mirror curvature changes under steady state operation is described in U.S. patent application Ser. No. 12/168,376, filed Jul. 7, 2008 (U.S Pre-Grant Publication No. 20090034577), assigned to the assignee of the present invention, and the complete disclosure of which is hereby incorporated by reference. This result is achieved by designing a mirror with a mirror body of a particular shape with strips of a material different from that of the body attached to the body to provide a compensating bi-metallic effect. An example of the arrangement is depicted in FIG. 1 and FIG. 1A.

Here, the mirror-arrangement 10 includes a metal mirror-body 12 having a generally T-shaped cross-section, with a head portion 14 and a stem portion 16. A concave surface is generated, polished, and coated on the base of the stem portion to provide a concave reflective surface 18 having a radius of curvature R. Typically, the width L of the reflective surface is about equal to the width of the slab discharge for a turning mirror and somewhat shorter, for example between about 12% and 17% shorter than the discharge width for an output coupling mirror to allow output to be coupled out of the resonator. The height h of the reflective surface is typically about six times the height of the discharge, i.e., six times the separated of the discharge electrodes.

Strips 17 of a metal different from that of body 12 are bolted to the underside of the head-portion of the body. In an example described in the patent publication, the body 12 is made from copper and the strips 17 are made from stainless steel. The purpose of the strips is create a bimetallic stress that in steady-state operation, will compensate for differential expansion of the body that tends to increase the radius of curvature of the mirror due to a front-to-back thermal gradient in the mirror.

Mirror arrangement 10 was designed for use in a slab laser having an average power of about 400 kilowatts (kW). The arrangement was successful in compensating long term curvature changes at that power to an extent described in the above referenced '577 publication.

Subsequently, a mirror having this configuration was used in a laser having an average output power of 1.5 kW (about 4 times the original design power). In this case, a very strong transient change in beam pointing was observed immediately after turning on the laser at the 1.5 kW power.

FIG. 1B is a graph schematically illustrating pointing stability (far-field angular beam-position as a function of time) of a slab laser having a power of about 1.5 kW average, and including mirrors designed according to the arrangement of FIG. 1. Power output was at 60% duty cycle with at a (PRF) of 10 kHz. Output coupling was 12%. It can be seen that immediately after the laser was turned on, there was a beam deflection of 400 microradians (μrad) in about 0.75 seconds with the beam assuming to a more or less constant deflection of about 450 μrad, within about one-second, over the time period of the graph.

In most laser-processing operations a work-piece is positioned in the laser-beam path before the laser is turned on, and the material processing occurs sufficiently quickly that beam pointing uncertainty of even one-second duration is significant and can adversely affect the processing operation. Accordingly, it would be advantageous to minimize if not altogether eliminate, transient pointing variations, however short, of the type exemplified by the graph of FIG. 1B.

SUMMARY OF THE INVENTION

In one aspect a mirror structure in accordance with the present invention for reflecting a laser beam comprises a body have a reflective surface formed thereon for reflecting the laser beam. The surface becomes heated by the laser beam when in use. The body is configured so that the thermal neutral plane of the body is about aligned with the position of the reflective surface to minimize distortion of the curved surface due to the heating.

In a preferred embodiment of the inventive mirror structure, the mirror body includes an elongated mirror member and a pair of thermal balancing members. The mirror member has a rectangular cross-section and the reflective surface is a concave front surface of the mirror member having a predetermined curvature. The thermal balancing members are attached to top and bottom surfaces of the mirror member and extend in a forward direction beyond the reflective surface of the mirror member.

The alignment of the thermal neutral plane with the reflective surface minimizes changes to the mirror curvature due to heating. Experimental evaluation of a laser including such mirrors indicates that the above discussed transient spike in beam pointing is essentially eliminated by use of the inventive mirrors.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
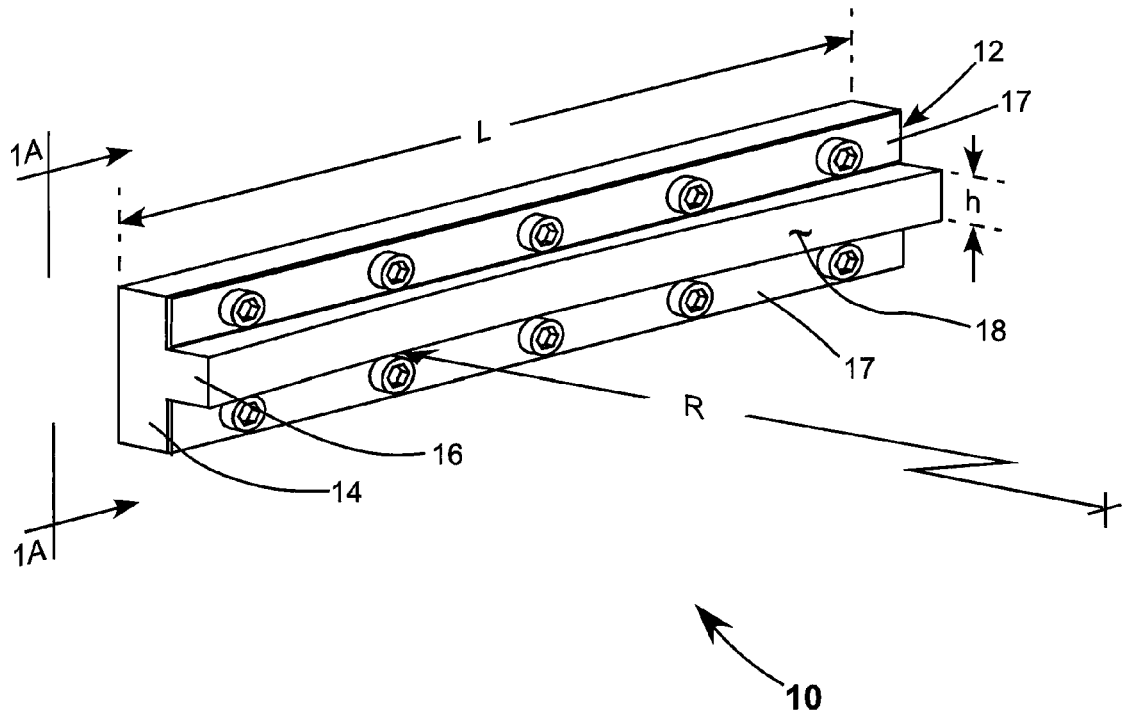
FIG. 1 is a three dimensional view schematically illustrating a prior-art $CO_2$ slab-laser mirror configured to minimize thermally-induced curvature changes of a reflecting surface thereof.
Figure 1A:
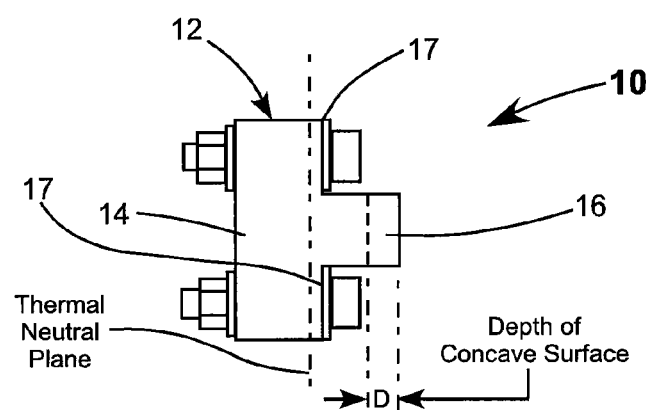
FIG. 1A is and end elevation view seen generally in the direction 1A-1A of FIG. 1, schematically illustrating further detail of the mirror of FIG. 1.
Figure 1B:
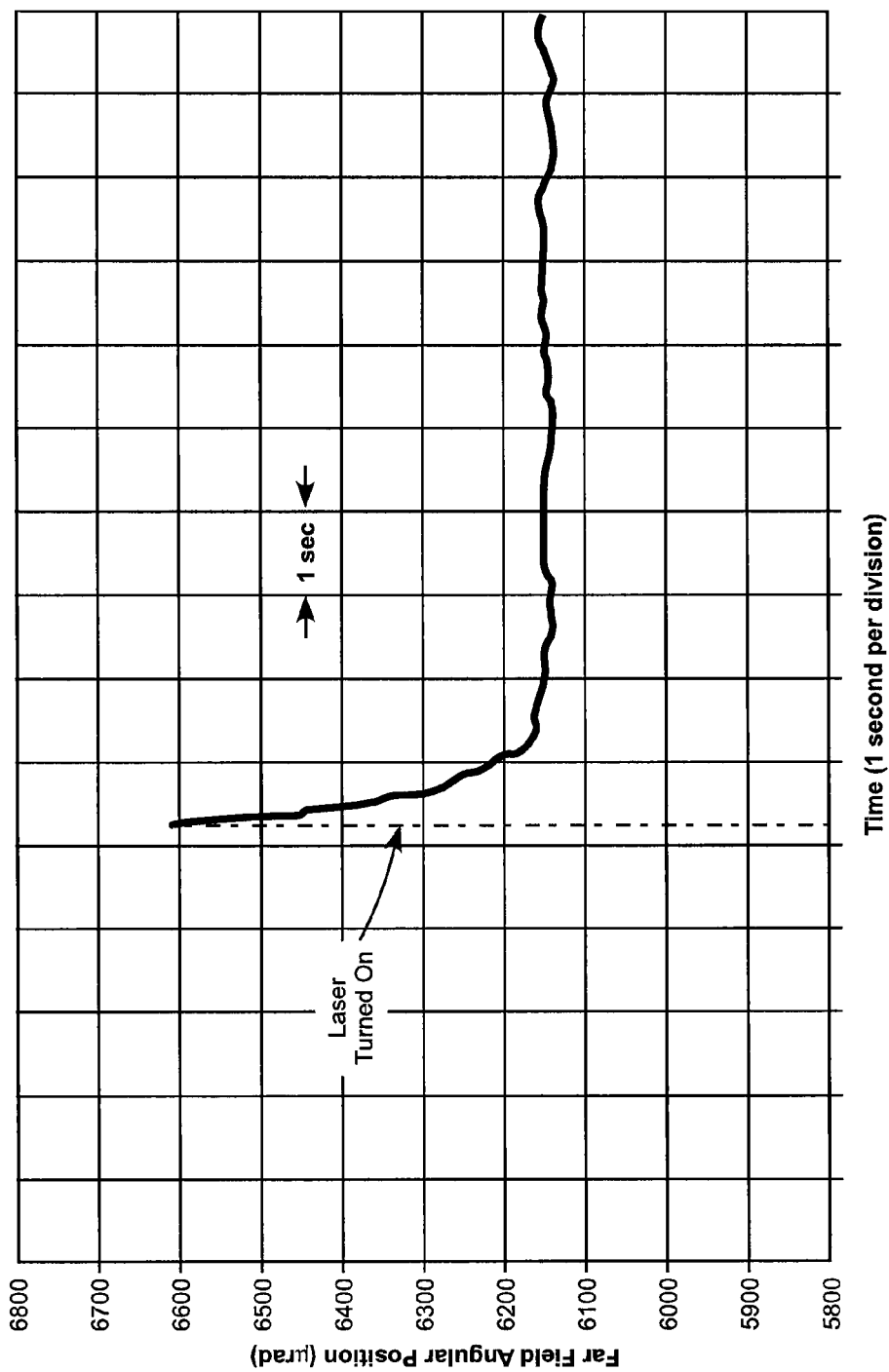
FIG. 1B is a graph schematically illustrating far-field angular position as a function of time for a beam from a 1.5 kW average power $CO_2$ slab-laser incorporating a mirror similar to the mirror of FIG. 1.

A finite element thermal analysis (FEA) was conducted for a mirror arrangement similar to that which was responsible for the result depicted in the graph of FIG. 1B, in an attempt to determine a possible reason for the transient performance. The thermal analysis was directed in particular to determining the position of a "thermal neutral plane" (TNP) of the arrangement.

The TNP of a structure is a well known fundamental concept. It is defined as a plane within a structure that undergoes no changes in shape due to heating of the structure. It corresponds generally with the geometric centroid of the structure, and is a plane when the structure has a uniform cross-section, whatever the cross-section shape. When the structure is heated from one side of the TNP, the net stress within the TNP is zero because on one side of the TNP, the material is stressed in tension while on the other side of the TNP, the material is in compression. The mass of material on each side of the TNP is about the same.

In the case of a slab laser resonator mirror, heating occurs primarily as a result of absorption by the reflective surface of the mirror of a small but finite percentage of laser radiation circulating in the resonator. It should be borne in mind that with 12% output coupling and 1.5 kW average power output there are 11.0 kW circulating in a resonator, and a 0.5% absorbing surface will absorb about 62 W.

The result of the above-mentioned analysis indicated that the thermal neutral plane of the mirror is located slightly behind the stem portion of the mirror as indicated in FIG. 1A. It can be seen that the distance of the TNP from the closest point (here the center) on the mirror is greater that the depth D of the reflective surface between the ends of the surface and the center or vertex of the surface.

It was decided that in order to eliminate, or at least mitigate, transient pointing effects associated with mirror 10 of FIG. 1, the thermal neutral plane should be moved forward to about coincide with the reflective surface of the mirror. This is not possible with a mirror body having the cross-section shape of prior art mirror arrangement 10, with or without the added strips.

Figure 2:
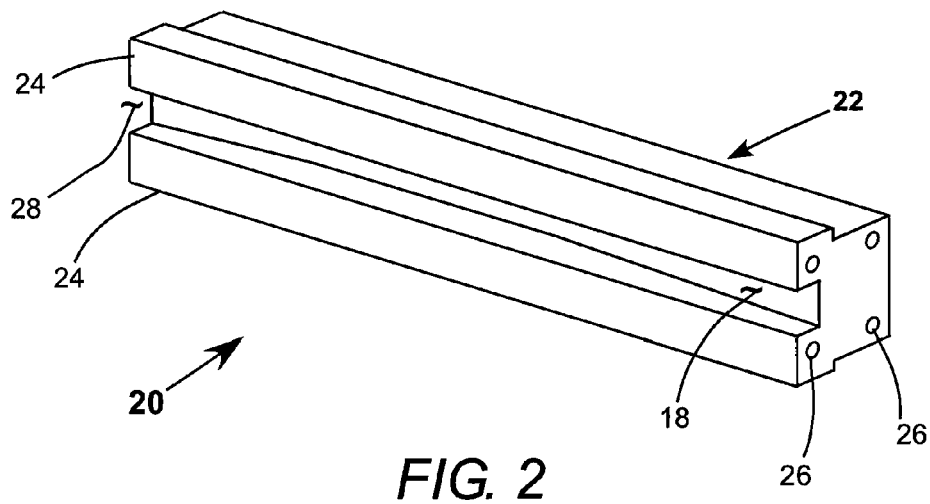
FIG. 2 is a three-dimensional view schematically illustrating a preferred embodiment of a $CO_2$ slab-laser mirror in accordance with the present invention configured to minimize thermally-induced curvature changes of a reflecting surface thereof.
Figure 2A:
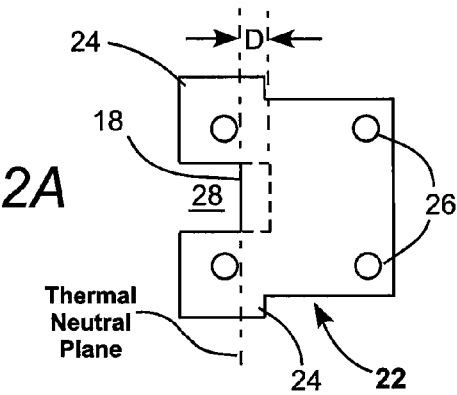
FIG. 2A is an end-elevation view schematically illustrating further detail of the mirror of FIG. 2.

FIG. 2 and FIG. 2A schematically illustrates a mirror 20 in accordance with the present invention including a mirror body 22 having a somewhat U-shaped cross section with sides 24 extending beyond concave reflective surface 18. Considered from another viewpoint, reflective surface 18 could be described as being the base of a channel 28 in mirror body 22. Preferably, channels 26 are provided, extending through sides 24, to allow passage of a cooling fluid. This arrangement of sides extending beyond the reflective surface of the mirror body provide that the mirror body has mass forward of the reflecting surface. This is important for allowing dimensions of the body to be selected such that the thermal neutral plane about coincides with the ends of the reflective surface, the center or vertex of the reflective surface, or somewhere therebetween. The term "forward" as used here, refers to the direction in which the reflective surface faces.

In FIG. 2A the TNP is depicted as being coincident with the ends of the reflective surface, but may generally be located in a plane between about coincident with the ends of the surface or about tangential to the center or vertex of the surface. It should be noted here, that while the present invention is described herein with reference to mirror-assemblies having a concave reflecting surface, principles of the present invention are equally applicable to a mirror-assembly having a convex surface as would be required to form a positive branch unstable resonator.

It is believed, without being limited to a particular hypothesis, that the position of the TNP in the inventive elongated mirror-assembly is substantially independent of the heat load on the reflective surface and substantially independent of the coolant flow in channels 26. The TNP is, however, somewhat dependent on the volume, occupied by channels 26 and the position of the channels.

It should be noted here that if the top surfaces of sides 24 are curved to match the curvature of reflective surface 18 the thermal neutral plane can curved to be about co-planar with surface 18 along the entire length of the surface. Analysis suggests, however, that such a refinement will not provide a significantly different result from that when the thermal neutral plane is not curved but located in the above specified region.

Those skilled in the art will recognize that the one-piece the body form of FIG. 2A, while convenient for mechanical analysis, is somewhat impractical from a manufacturing standpoint, as it would be extremely difficult to polish and optically coat a reflective surface 18 in the base of a channel 28. A description of two practical body-forms for mirror 20 is set forth below with reference to FIGS. 2B and 2C.

Figure 2B:
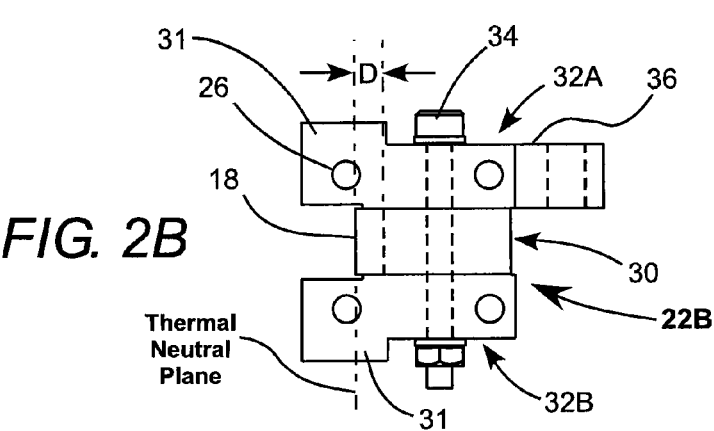
FIG. 2B is an end-elevation view schematically illustrating one example of a preferred alternative construction of the mirror of FIG. 2 including a center section on which a reflective surface is formed and having a sidebar clamped on each side-of the center section extending beyond the reflective surface.

FIG. 2B depicts a mirror-body assembly 22B in accordance with the present invention, fabricated in three sections. Concave reflective surface 18 of the mirror is generated polished and coated on an edge of a center bar 30 having a rectangular cross-section. The mirror surface has a depth D is described above in previous examples. A side-wall or side-bar 32 is clamped on each side of center bar 30 by a series of bolts 34 (only one visible in FIG. 2B. Cooling channels 26 extend through the side-bars.

Side-bars 32A and 32B, which can be described as thermal balancing bars, are attached after mirror surface 18 of the center bar has been polished and coated. Preferably the center section and the side-bars are made from the same material. A preferred material is copper.

Portions 31 of side-bars 32 extend beyond the reflective surface to move the thermal neutral plane of the assembly forward. These portions are thicker than portions behind the reflective surface imparting somewhat L-shaped or stepped cross-section to the side-bars. Thickened portions 31 compensate for mass that is not in the space therebetween. In this example, again, the thermal neutral plane coincides with the ends of the reflective surface but may be anywhere in the above-discussed range. Side-bar 32A has a mounting boss 36 machined on a back edge thereof for mounting the mirror assembly to and end flange of a laser housing. Details of this mounting arrangement are discussed further hereinbelow.

Figure 2C:
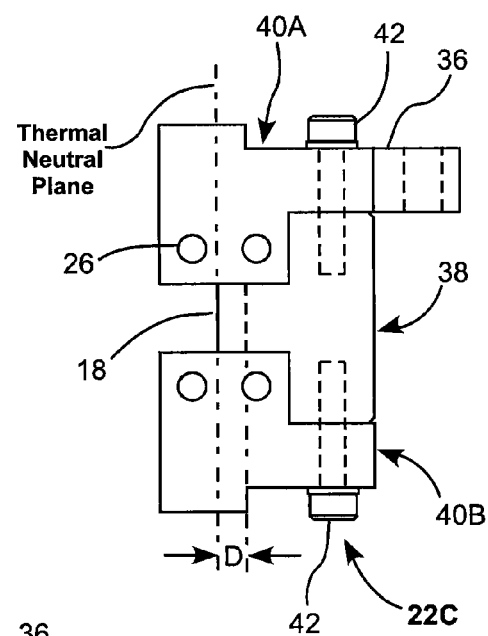
FIG. 2C is an end-elevation view schematically illustrating another example of a preferred alternative construction of the mirror of FIG. 2.

FIG. 2C depicts a mirror-body assembly 22C in accordance with the present invention, also fabricated in three sections. Mirror body is similar in principle to mirror body 22B with an exception that the three sections have a different cross-section shape from corresponding sections of assembly 22B. Center section 38 has a T-shaped cross-section of dimensions similar to those of prior-art mirror 10 of FIG. 1. Side-bars 40A and 40B are L-shaped and configured to make thermal contact with lateral surfaces of the center section when clamped thereof by screws 42. Side-bar 40A has a mounting boss 36 machined on a back edge thereof for mounting the mirror assembly to an end flange of a laser housing as discussed above with reference to mirror body 22B.

Figure 3:
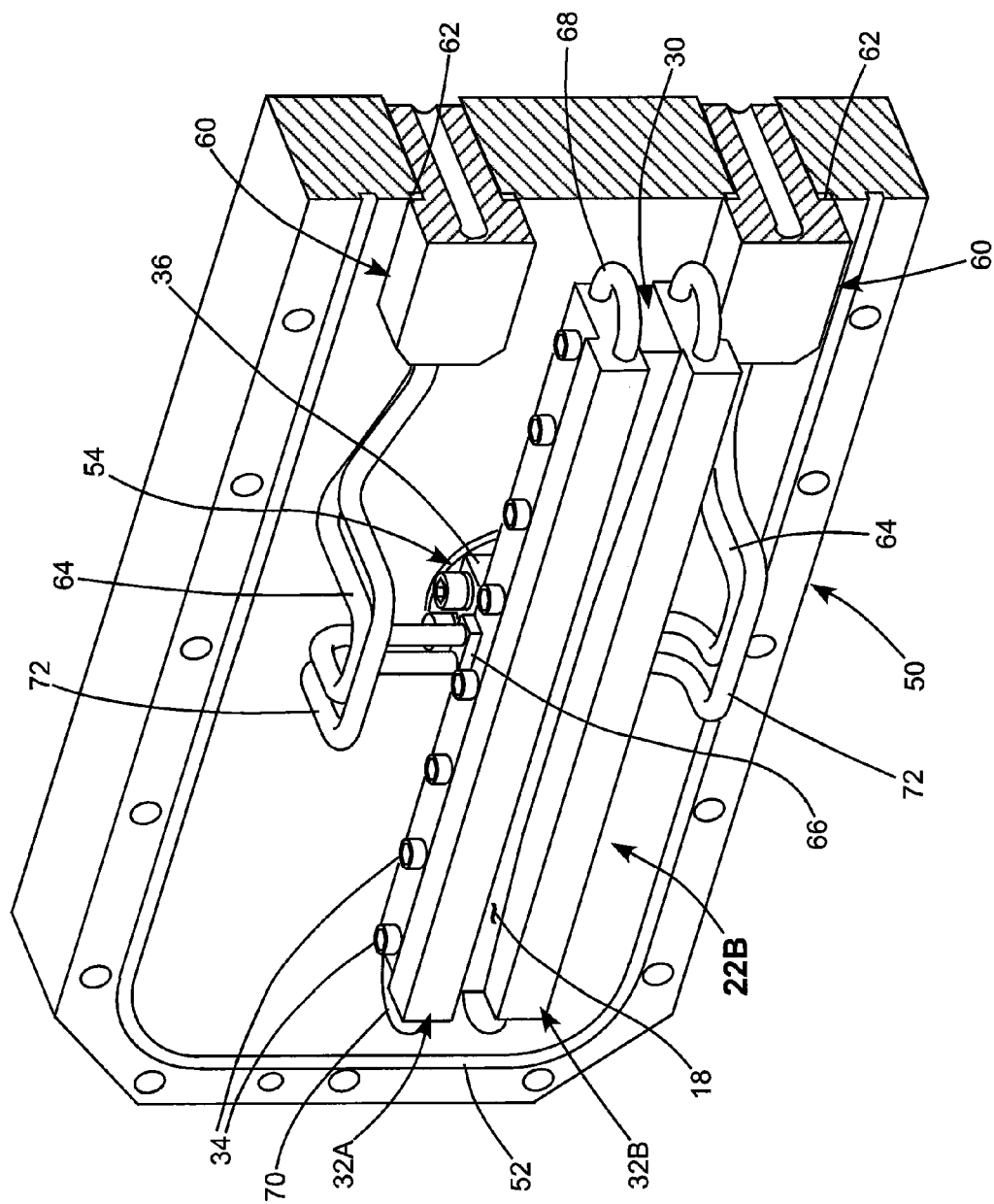
FIG. 3 is a three-dimensional view, partly in cross-section, schematically illustrating a mirror-assembly in accordance with the present invention constructed according to the example of FIG. 2B and mounted on a mirror-mounting post of one example of an end-flange of a CO2 slab-laser housing.
Figure 4:
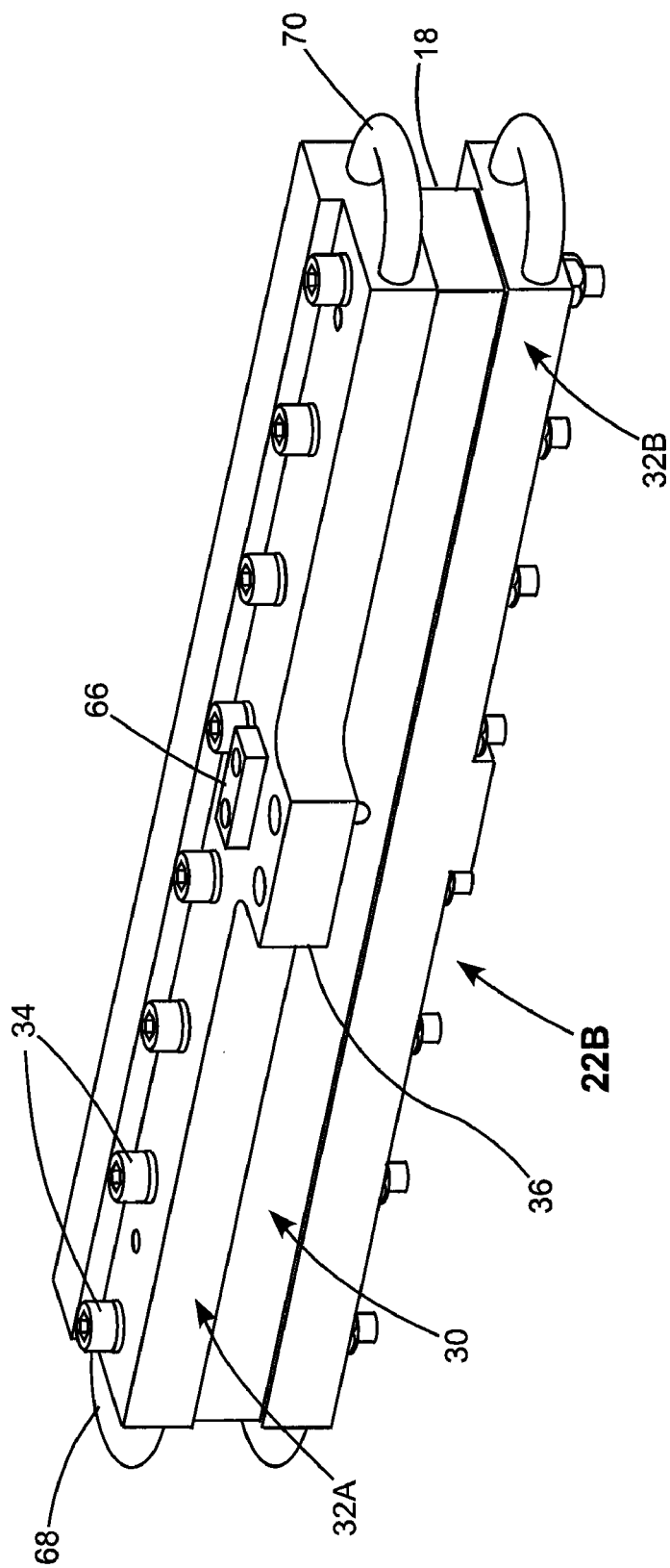
FIG. 4 is a three-dimensional view from the rear schematically illustrating further detail of the mirror-assembly of FIG. 3.
Figure 5:
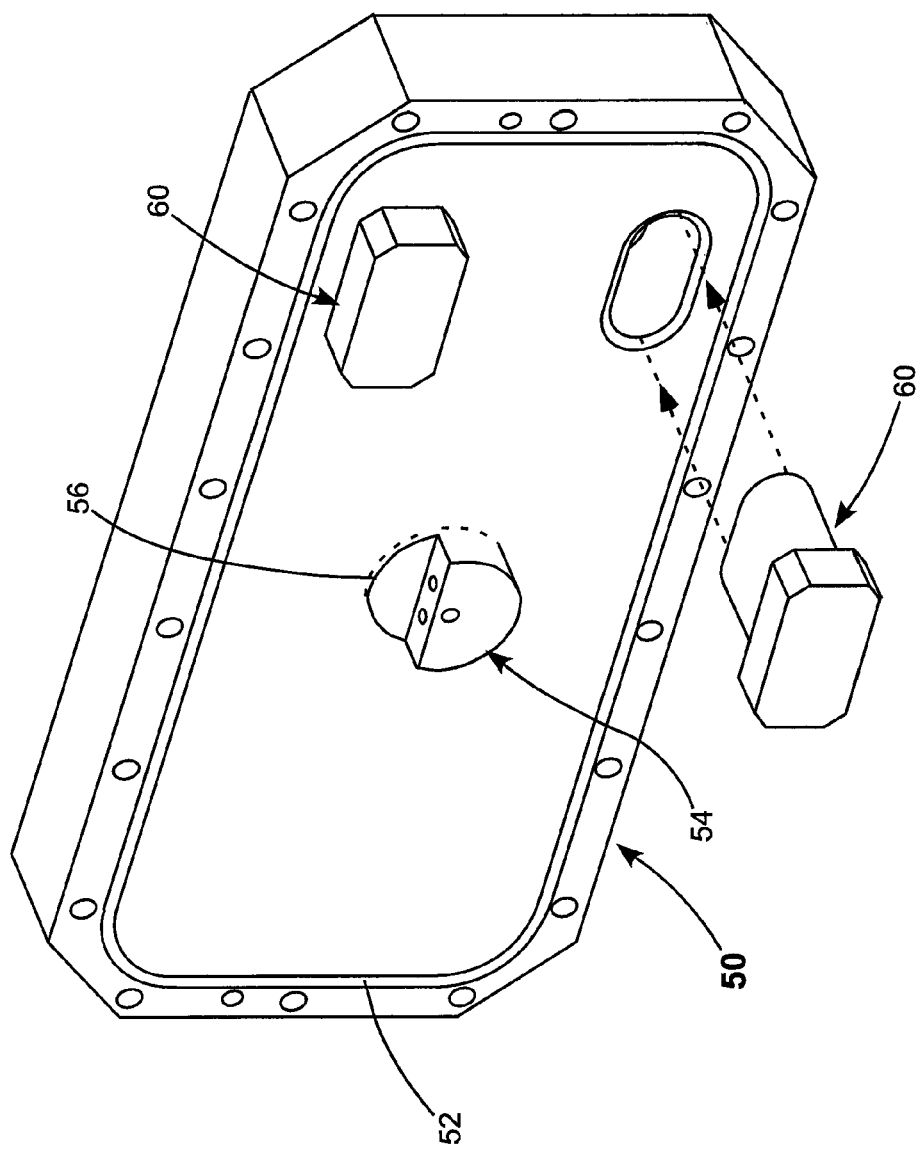
FIG. 5 is a three-dimensional view schematically illustrating details of the mounting post of FIG. 3.

FIG. 3, FIG. 4, and FIG. 5 schematically illustrate details of mounting a thermal neutral plane mirror in accordance with the present invention. Here, a mirror having the mirror assembly configuration 22B of FIG. 2B is mounted on a flange 50, which is one end-flange of a hermetically sealable housing (not shown) for accommodating a slab-laser resonator, electrodes, and a lasing gas mixture. A grove 52 extends around the flange adjacent the periphery thereof and is configured to accept a metal "C-ring" or an indium "O-ring" to facilitate sealing. It is contemplated that a similar mirror and flange arrangement will be sealed to an opposite end of the housing to form the unstable resonator.

Mirror assembly 22B is mounted on flange 50 by attaching mounting boss 36 on side-bar 32A (see FIG. 4 for details) to a post 54 (see FIG. 5 for detail) monolithically attached to flange 50 via an integrated flexible membrane 56 formed by machining the flange from the back side. This provides that the mounted mirror-assembly can be adjusted in two transverse axes for aligning the reflective surface thereof in the resonator. This method of mounting, in addition to allowing alignment of the mirror surface from outside off the laser housing reduces the probability of distorting the reflective surface by the attachment process. The method also allows coolant channels to be placed within the length of the side-bars rather than within the center section further reducing the possibility of distorting the reflective surface. A detailed description of the alignment arrangement is not necessary for understanding principles of the present invention. A detailed description can be found in the above referenced '577 publication.

The narrow length of mounting boss 36, relative to the length of the mirror-assembly, minimizes mechanical and thermal communication between the mirror assembly 22B and the flange 50. This provides that the mirror assembly can be treated as a stand-alone (essentially isolated) assembly from the point of view of determining the TNP location.

Cooling arrangements for mirror-assembly 22B are as follows. A main (outer) coolant manifold (not shown) located on the backside of the flange splits and directs coolant flow to upper and lower secondary (inner) coolant manifolds 60 which extend through the flange and are sealed to the flange by gaskets 62. The secondary coolant manifolds are each preferably made from gold-plated copper. An outlet of each inner coolant manifold directs coolant into a conduit 64 which directs the flow into the center inlet/outlet port 66 of each of upper and lower mirror side bars 32A and 32B. The coolant is circulated through channels 26 in the side-bars by U-shaped conduits 68 and 70. The coolant returns to port 66 and is direct from the port by a conduit 72 back to the inner coolant manifold which directs the coolant back to the outer manifold.

Figure 6:
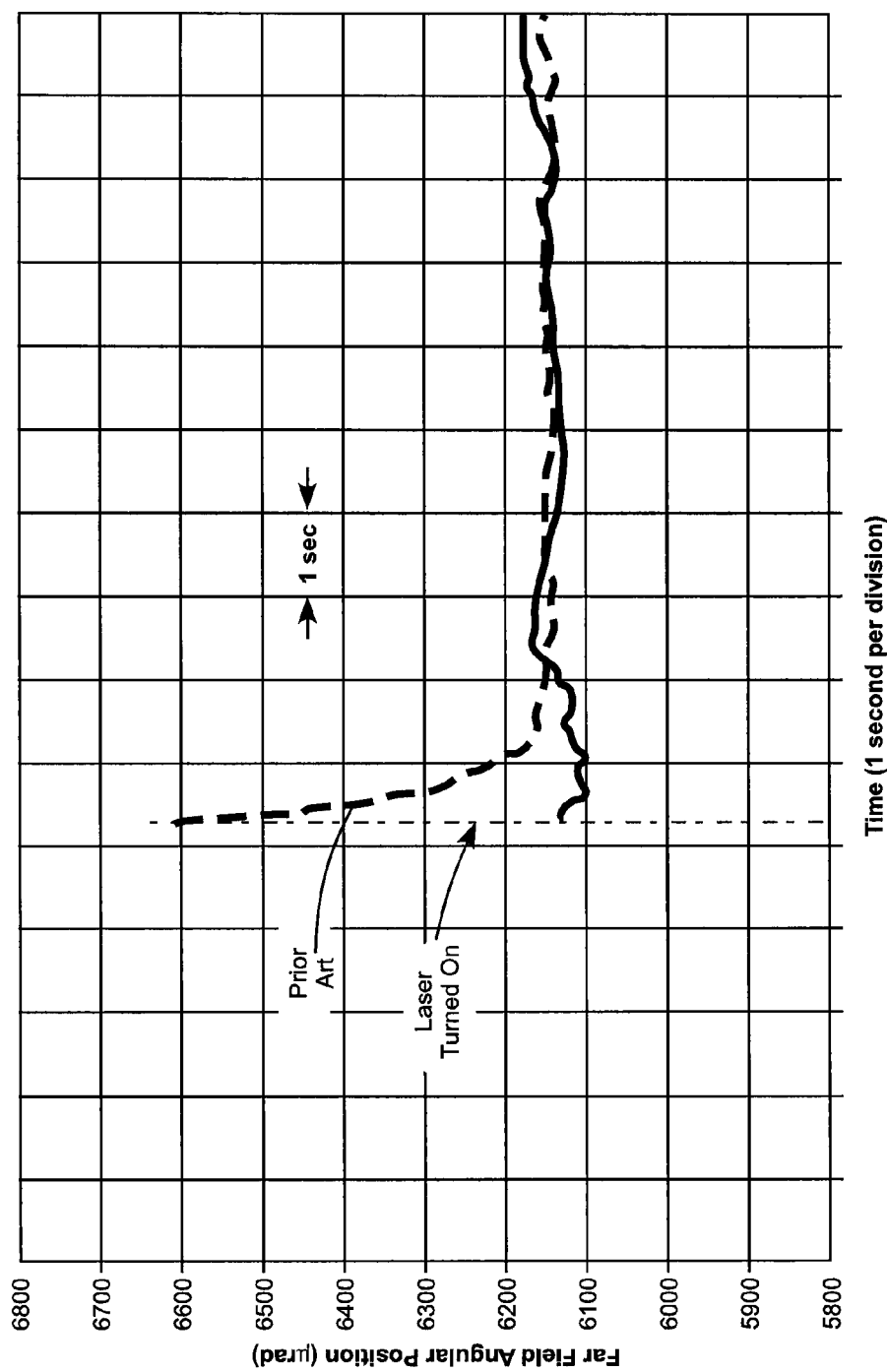
FIG. 6 is a graph schematically illustrating far-field angular-position as a function of time in one example of a laser incorporating the mirror of FIG. 3 compared with the far-field angular-position as a function of time of the prior-art mirror of FIG. 1B.

FIG. 6 is a graph schematically illustrating measured far-field angular-position as a function of time in one example of a laser incorporating highly reflecting and output coupling mirror-assemblies having the general configuration of the mirror of FIG. 3 (solid curve), compared with the measured far-field angular-position as a function of time of a similar laser having the prior-art mirror configuration of FIG. 1 (dashed curve). The laser in each case is a sealed-off $CO_2$ slab laser, with the mirrors forming a negative branch unstable resonator. The laser output-power in each case was approximately 1.5 kW average at 60% duty cycle with at a (PRF) of 10 kHz. The output coupling for each example was 12%. It can be seen that the inventive mirror configuration essentially completely eliminates the transient deflection "spike" experienced with the prior art. The thermal time constant of the mirror averages out pulse to pulse deflection effects at the 10 kHz PRF.

Dimensions of one of the inventive mirrors, made from gold plated copper, are as follows. The length of the mirror is 159 mm. The radius of curvature of the mirror is 1044.55. The center section 30 has a thickness of 8.0 mm. Side-bars 32A and 32 each have a thickness of 9.7 mm at the forward edge and a thickness of 7.6 mm at the rearward edge. The total width of each side-par is 25.4 mm, with the forward 9.7 mm-thick portion having a width of 10 mm. Mounting boss 36 on the upper side-bar 36 has a width of 10.2 mm and a length of 20.3 mm. The absorption of each of the reflective surfaces is estimated at about 0.2%. Cooling channels 26 have a diameter of 0.125 inches and are located 0.118 inches and 0.160 inches from the front surface of the sidebars. The length of the output coupling mirror is 132 mm and the radius of curvature is 887.85 mm.

The deflection measurements were made using a Pyrocam™ III pyroelectric array camera, available from Ophir-Spiricon Inc. of Logan, Utah. The camera recording-speed was approximately 25 frames per sec.

Figure 7:
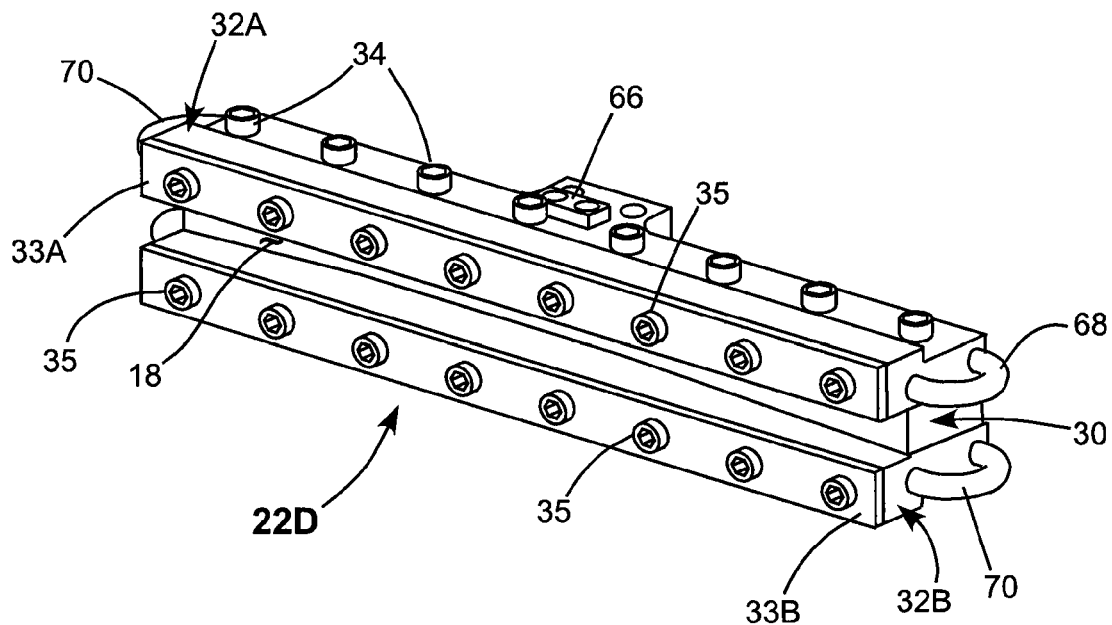
FIG. 7 is a three dimensional view from the front, schematically illustrating yet another example of a mirror assembly in accordance with the present invention constructed similarly to the example of FIG. 2B but wherein the side bars each have a strip of material attached thereto, each strip being of a material different from that of the side-bar.

FIG. 7 is a three dimensional view from the front, schematically illustrating yet another example of a mirror-assembly 22D in accordance with the present invention. Assembly 22D is constructed similarly to the example assembly 2B of FIG. 3 with an exception that on a forward-facing face of each of side-bars 32A and 32B are attached strips 33A and 33B respectively of a material (metal) different from that of the side-bars. The terminology forward-facing, here, and in claims appended hereto means facing into the resonator (not shown) of which reflective surface 18 is one end mirror, i.e., facing in the direction that the reflective surface faces. The strips are attached to the side-bars by screws 35. The length of screws 35 should be selected to be short enough such that screws do not impeded the coolant channel in the sidebar. In this embodiment, the strips are formed from a material that has a lower coefficient of thermal expansion than the metal material of the bars. Stainless steel is one suitable material for strips 33A and 33B when the sidebars are made from copper.

Because of the differential expansion rates of the two materials, the bars and strips will exhibit the bimetallic effect. In this case, the bimetallic effect tends to cause the concave mirror to become more concave. In contrast, the differential heating induced by absorption of some of the laser energy tends to causes the mirror to become less concave. By proper selection of the thickness and size of the steel strips, the two effects can be balanced, thus minimizing distortion.

Figure 8:
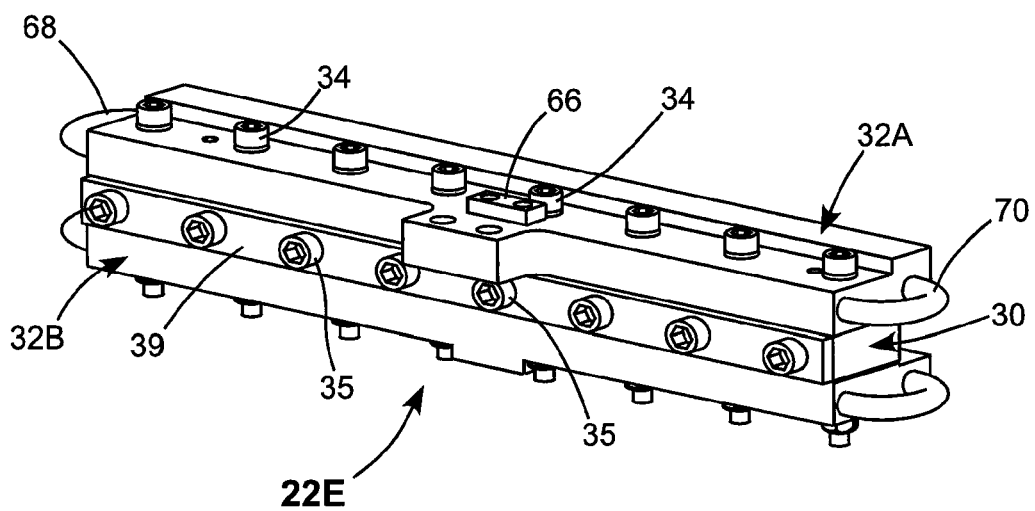
FIG. 8 is a three dimensional view from the rear, schematically illustrating yet another example of a mirror assembly in accordance with the present invention constructed similarly to the example of FIG. 2B but wherein the center section has a strip of material attached thereto, the strip being of a material different from that of the center section.

FIG. 8 is a three-dimensional view from the rear, schematically illustrating still another example 22E of a mirror assembly in accordance with the present invention. Mirror assembly constructed similarly to assembly of FIG. 2B of FIG. 3 but wherein center section 30 of the assembly has a strip 39 of material attached by screws 35 to a rearward-facing, surface of the center section, the strip being of a material different from that of center-section 30. In this embodiment, the coefficient of thermal expansion of the strip is selected to be greater than the coefficient of thermal expansion of the center section to counter the effects of the thermal gradient induced by heating the front surface of the mirror. Aluminum is a suitable material for strip 39 when center section 30 is made from copper.

This arrangement of strips on the side bars or the center section provides for bi-metallic effects which offer an additional degree of freedom in the design of the inventive mirror-assembly. This additional freedom could, for example, be useful in providing a design which minimizes or eliminates a gradual change in curvature of reflective surface 18 in extended operation of a laser over a time much longer than the measurement time of FIG. 6.

Those skilled in the art to which the present invention pertain will recognize, from the representation of inventive mirror-assemblies in FIGS. 3, 4, 7 and 8, that components of the assemblies have dimensions that are relatively to scale. Exemplary dimensions for a tested embodiment of the mirror are provided above. Based on these relative and actual dimensions, those skilled in the art to which the present invention pertains may readily determine corresponding starting-shapes for refinement in finite element analysis (FEA) software to determine thermal neutral plane positions for embodiments of the mirrors for different resonator configurations and selected materials. Using such software, those skilled in the art may determine other mirror-assembly arrangements that will provide for a thermal neutral plane about coincident with a reflecting surface without departing from the spirit and scope of the present invention.

The present invention is described above in terms of preferred and other embodiments. The invention is not limited, however, to the embodiments described and depicted. Rather, the invention is limited only by the claims appended hereto.

What is claimed is:

1. A mirror structure for reflecting a laser beam comprising:
   a body have a curved reflective surface formed thereon for reflecting a laser beam, the surface becoming heated by the laser beam when in use; and
   the body being configured so that the thermal neutral plane of the body about coincides with the position of the curved surface to minimize distortion of the curved surface due to the heating.

2. The minor structure of claim 1, wherein the body includes a center portion on which the curved surface is formed, and side portions on each side of the center portion, the side portions extending forward and behind the reflective surface.

3. The minor structure of claim 1, wherein the reflective surface is a concave surface.

4. The minor structure of claim 3, wherein the thermal neutral plane is located between about coincident with the ends of the reflective surface and about tangential to the center of the reflective surface.

5. The minor structure of claim 1, wherein there are channels formed in the minor body for circulating a coolant fluid therein.

6. A mirror structure for a reflecting a laser beam comprising:
   an elongated minor member having a curved front surface for reflecting a laser beam, said surface becoming heated by the laser beam when in use; and
   a pair of elongated thermal balancing members mounted along top and bottom surfaces of the mirror member, with the front portion of each balancing member extending in a forward direction beyond the curved front surface of the minor member, with the thermal balancing members being configured to align the thermal neutral plane of the structure close to the curved surface to minimize distortion of the curved surface due to the heating.

7. The minor structure of claim 6, wherein the rear surface of one of the balancing members includes a mounting boss for connecting the structure to a minor flange of a laser.

8. The minor structure of claim 7, wherein the mounting boss has a length significantly less than the length of the thermal balancing members, to minimize thermal communication between the minor structure and the flange.

9. A mirror structure as recited in claim 6, wherein the thermal balancing members are fluid cooled.

10. The minor structure of claim 6, wherein the minor member has a rectangular cross-section and the thermal balancing members have an L-shaped cross-section with the front portion thicker than the rear portion and with the thicker front portion extending beyond the reflecting surface of the mirror member.

11. A mirror structure for a reflecting a laser beam comprising:
    an elongated center member having a rectangular cross and having an elongated concave reflective front surface for reflecting the laser beam, the surface having a predetermined curvature and the surface becoming heated by the laser beam when in use; and
    first and second of elongated side members attached to top and bottom surfaces of the center member, each of sidemembers having an L-shaped cross section providing an elongated thin portion and an elongated thick portion with the thick portion of each side member extending in a forward direction beyond the concave reflective surface of center member with the center and side members being configured to align the thermal neutral plane of the structure close to the concave reflecting surface to minimize changing of the curvature of the reflective surface due to the heating.

12. The minor structure of claim 11, wherein the thermal neutral plane is aligned between about coincident with the ends of the reflective surface and about tangential to the vertex of the reflecting surface.

13. The minor structure of claim 11, wherein the rear surface of one of the side members includes a mounting boss for connecting the structure to a mirror flange of a laser.

14. The minor structure of claim 13, wherein the mounting boss has a length significantly less than the length of the thermal balancing members, to minimize thermal communication between the minor structure and the flange.

15. The minor structure of claim 11, wherein the thermal balancing members are fluid cooled.

16. The minor structure of claim 11, wherein the front and side members are made from the same material.

17. The minor structure of claim 16, wherein the material of the front and side members is copper.

18. The minor-structure of claim 11, wherein the side members are made from a first material and a strip of a second material different from the first material is attached to a forward facing surface of each of the side members for further minimizing changing of the radius of curvature of the reflective surface due to the heating.

19. The minor structure of claim 18, wherein the side members are made from copper and the strips are made from stainless steel.

20. A mirror structure for a reflecting a laser beam comprising:
    an elongated minor member having a curved front surface for reflecting a laser beam, said surface becoming heated by the laser beam when in use; and
    a pair of elongated thermal balancing members mounted along top and bottom surfaces of the mirror member, with the front portion of each balancing member extending in a forward direction beyond the curved front surface of the minor member, with the mass of the thermal balancing members being configured to minimize distortion of the curved surface due to the heating.

21. The minor structure of claim 20, wherein the minor member has a rectangular cross-section and the thermal balancing members have an L-shaped cross-section with the front portion thicker than the rear portion and with the thicker front portion extending beyond the reflecting surface of the minor member.

* * * * *